United States Patent Office 2,759,468
Patented Aug. 21, 1956

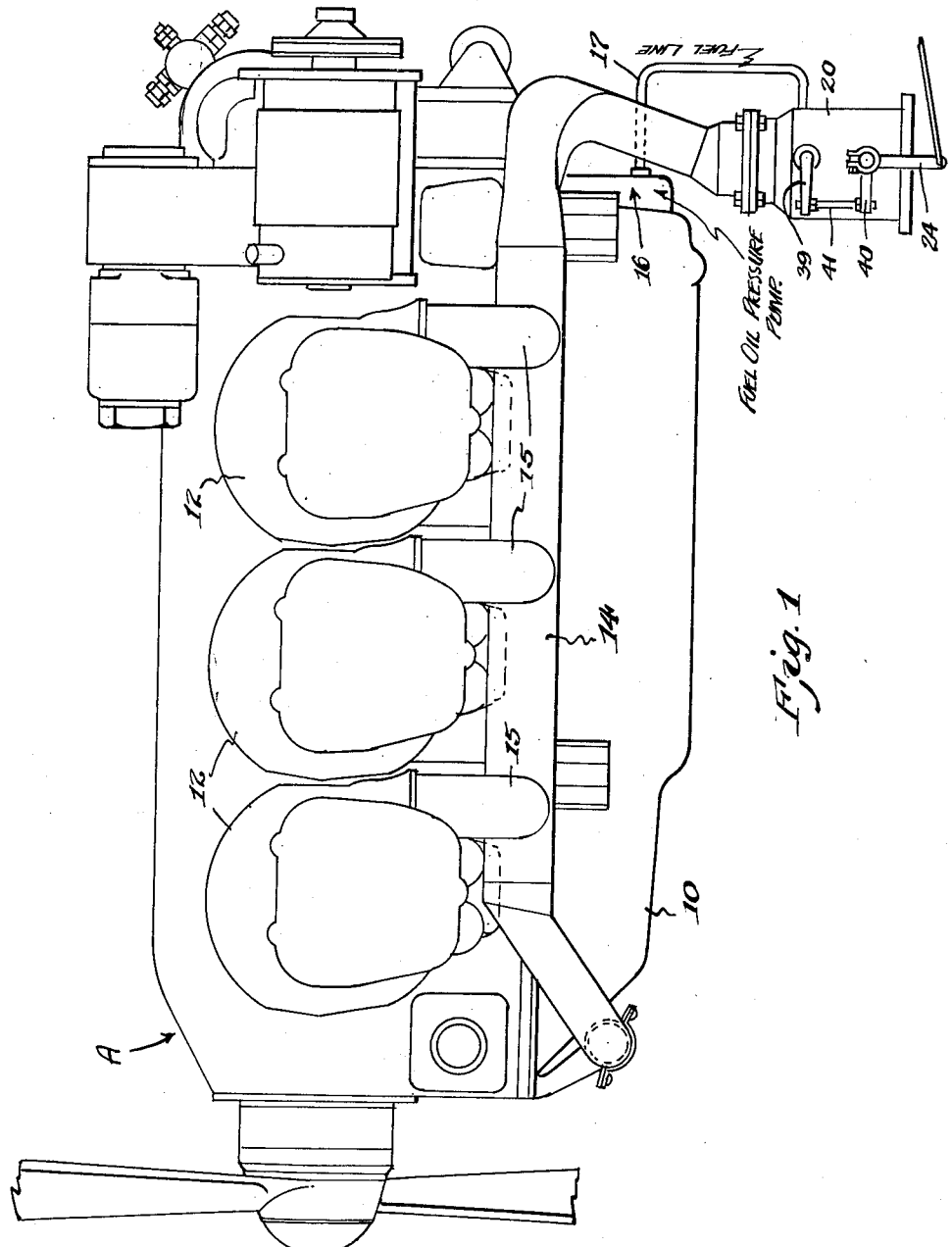

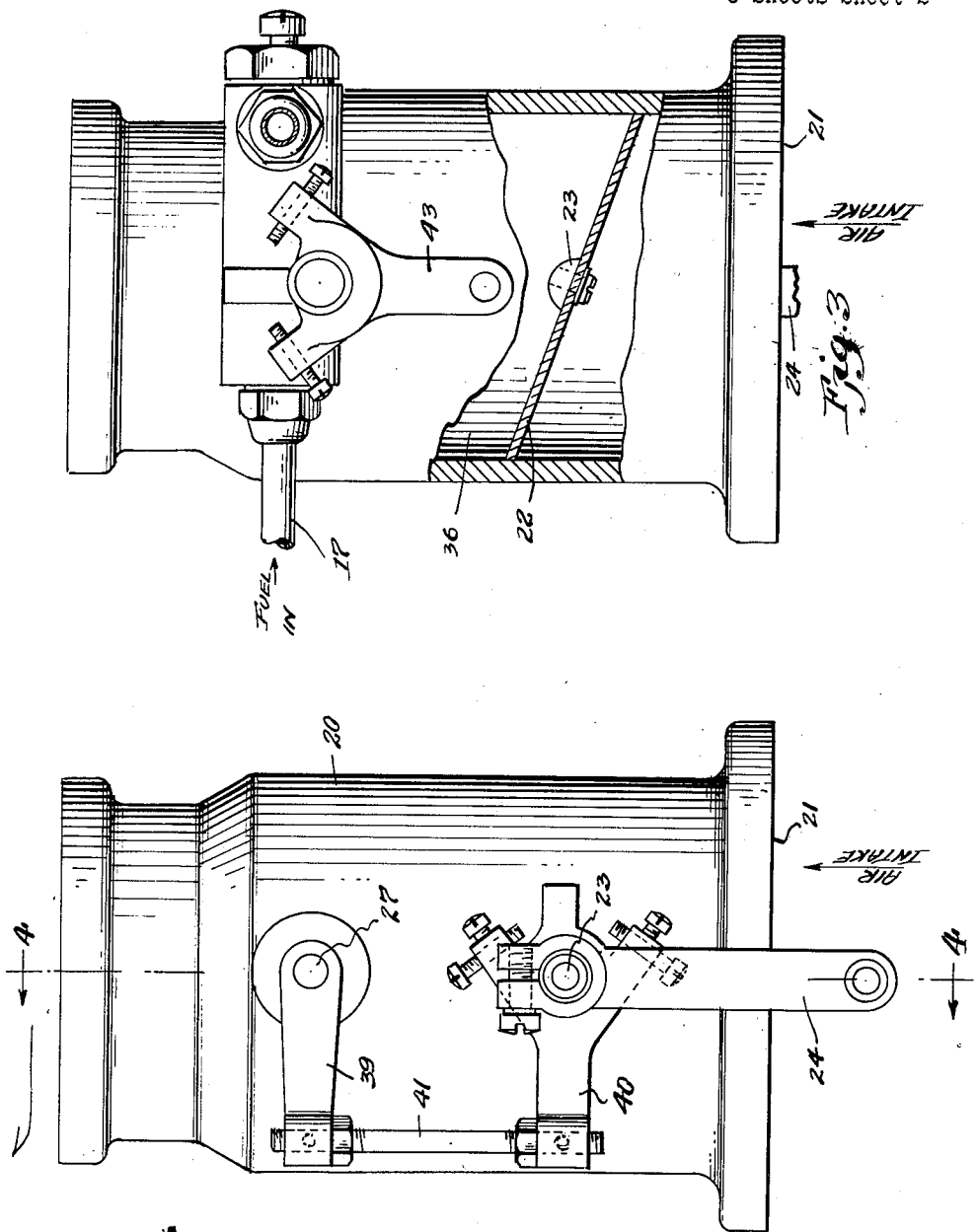

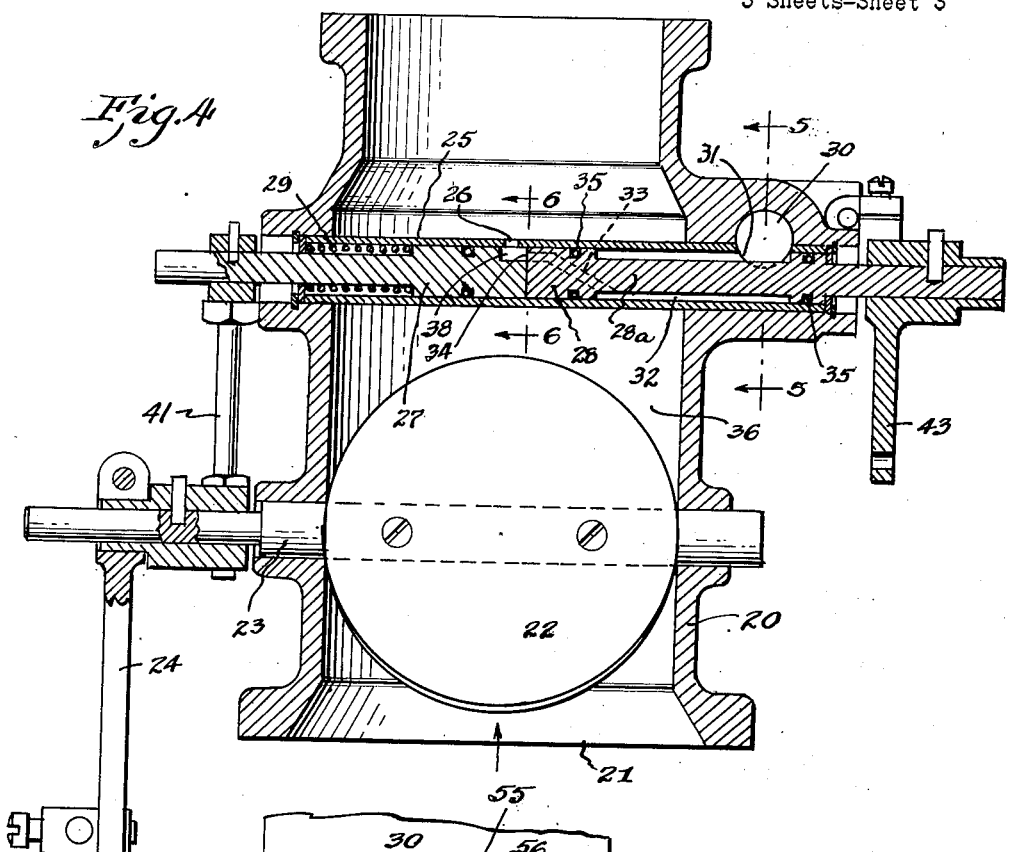
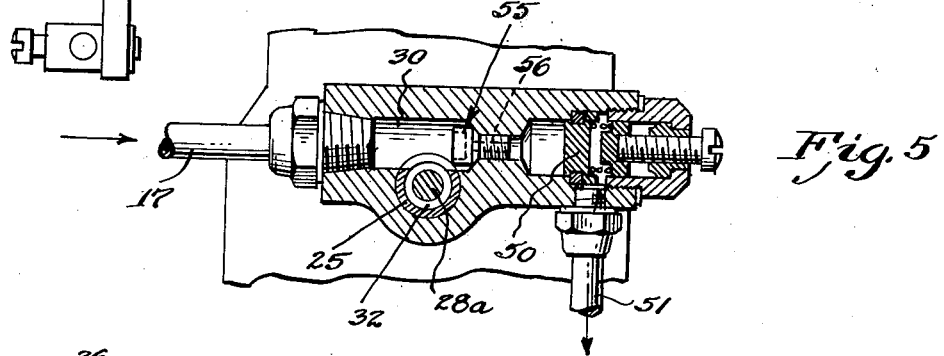
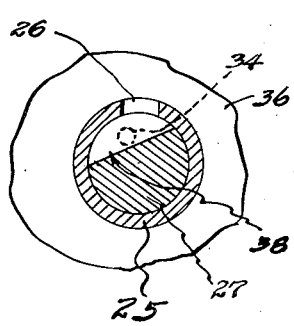
INVENTORS
Robert J. Powell
BY James E. Champion
Hauke + Hardesty
Attorneys

2,759,468

FUEL INJECTION SYSTEM

Robert J. Powell and James E. Champion, Muskegon, Mich., assignors to Continental Motors Corporation, Muskegon, Mich., a corporation of Virginia Application January 8, 1954, Serial No. 402,907

8 Claims. (Cl. 123—139)

Our invention relates to a continuous flow, fuel injection system for an internal combustion engine and more particularly to a uni-flow fuel injector for direct injection of fuel in an intake manifold of a multi-cylinder internal combustion engine, and which is more particularly applicable to a multi-cylinder aircraft engine.

Fuel injection is particularly desirable for aircraft engines, as such systems eliminate icing difficulties. However, the variable conditions encountered with aircraft engine operation present difficulties in metering which usually make for complex controls involving mechanisms responsive to various flight conditions. Such complicated mechanisms as heretofore employed are maintained in working order with some difficulty as frequent servicing is often required, and the maintenance and manufacturing costs of these mechanisms are in general more than carburetor installations.

An object of our invention is to provide a simplified fuel injection system for an internal combustion engine by constructing a uni-flow fuel injector comprising a minimum of moving parts and by which assembly is readily had with a primary air intake section or conduit whereby fuel is delivered in measured quantities direct into the engine intake manifold to facilitate efficient engine performance.

For a more detailed understanding of the invention, reference may be made to the accompanying drawings illustrating a preferred embodiment of the invention in which like parts are referred to by like characters throughout the several views, and in which Fig. 1 is a side elevational view of an aircraft internal combustion engine equipped with a fuel injector according to the principles of our invention.

Fig. 2 is a side elevational view of the primary air intake of the engine injection system showing our injector means assembled therewith.

Fig. 3 is an elevational view, partly in section, of the other side of said primary air intake section.

Fig. 4 is a vertical sectional view thereof, taken substantially on the line 4—4 of Fig. 2 and showing the injector in section.

Fig. 5 is a detailed sectional view taken on the line 5—5 of Fig. 4, and

Fig. 6 is a detailed sectional view taken on the line 6—6 of Fig. 4.

In the drawings, our invention is illustrated in connection with an aircraft multi-cylinder engine A of standard construction, said engine comprising a crankcase 10, a cylinder block structure 11 having cylinders 12 and an intake manifold 14 having lateral runners or fuel mixture conducting portions 15 connecting said manifold with each of said cylinders. A conventional fuel pump 16 is carried by said engine and conveniently driven by said engine, the outlet or delivery side of said fuel pump being connected with the injector by a pipe or conduit 17.

The engine intake manifold is connected with the primary air intake section pipe or conduit 20, sometimes referred to as the "riser." The air is delivered to the intake end 21 of said riser, and said air flow is controlled by the throttle air valve 22, same consisting of a butterfly valve mounted on the shaft 23 supported by said riser and having a lever or arm 24 mounted on the end thereof externally of the riser (see Figs. 2 and 4).

A fuel injector unit B is assembled to said riser downstream from said air throttle valve, and same comprises a pipe or sleeve 25 fixedly supported by the riser walls and extending traversely across the air passage 26 formed by said riser. A fuel discharge opening or jet 26 is provided in this sleeve, which opening faces downstream, and a pair of coaxial shafts 27 and 28 are rotatably supported within the sleeve 25. The flat end faces of these shafts abut, and shaft 27 is yieldingly urged longitudinally by spring 29 to effect a good contact between the abutting faces of the shafts. The fuel from the fuel pump 16 enters the bore or passages 30 from the fuel line 17, through the cutaway portion 31 of the sleeve 25, into the annular passage 32 about the reduced diameter portion 28a of said shaft 28, and thence through the passage 33 which passage terminates in an outlet discharge port 34 in the inner end face of shaft 28. Sealing rings 35 are carried by shaft 28 to seal against leakage of fuel around the shaft.

The shaft 27 is provided with an eccentric annular groove 38 at the inner end face thereof, which eccentric groove is adapted to register with port 34. The other end of said shaft 27 is pinned or otherwise secured to a lever or arm 39. An arm 40 is secured to the air throttle valve shaft 23 and said arms 39 and 40 are connected by a link 41, so that as the air throttle is angularly adjusted by means of lever or arm 24, the shaft 27 is likewise rotated, thus angularly adjusting the eccentric groove 38 with respect to the port 34 in shaft 28. For idling engine operation, the air throttle valve is almost closed and the end of shaft 27 masks most of the port 34, and just enough fuel is thus discharged through the opening 26 to take care of the idling engine. As the throttle is moved towards wide open, the shaft 27 is angularly adjusted and progressively unmasks more and more of the port 34, allowing more and more fuel to be discharged into the riser to take care of the increased engine speed. The shaft 28 is angularly adjusted by lever 43 to relatively adjust or position the port 34 with respect to the eccentric groove or recess 38, whereby to enrich or lean out the fuel mixture as supplied to the engine. Under normal engine operation, the relation of said port 34 and eccentric groove 38 is such as to give the proper fuel and air mixture for the engine throughout its operating range. It will be noted that as the engine is opened up by opening the throttle, the fuel supply is likewise increased as the port 34 is opened wider and the fuel pump delivers more fuel to meet the heavier demand for fuel, as it is driven by the engine, and consequently delivers more fuel on this account, for the entire speed range of the engine, said shafts 27 and 28 being relatively adjusted to achieve the most ideal mixture for all speeds of engine operation.

In the operation of the engine, especially under varying loads, the engine speed has a tendency to pick up speed at times even though the throttle has not moved. In an aircraft engine, the pilot sometimes has occasion to feather or adjust the propeller blade with the result that the engine picks up speed, sometimes increasing the engine speed as much as 200 R. P. M. The fuel pump, being driven by the engine, delivers more fuel, but normally this excess fuel is merely spilled back into the fuel tank as there can be only so much fuel delivered through port 34, groove 38 and discharge jet or opening 26.

The spring loaded relief valve 50 acts to maintain a desired maximum fuel pressure in the system, and in the particular engine herein illustrated and claimed, the relief valve is adjusted to maintain a maximum pressure of about ten pounds, the surplus fuel being dumped past this relief valve and returned to the tank or intake side of said fuel pump through the line or conduit 51. Any suitable type of relief valve may be incorporated in the present system, and to take care of this increased engine speed while the throttle remains fixed, a pre-set jet 55 is interposed in the fuel pressure line ahead of relief valve. This jet 55 is provided with a relatively small jet opening 56 of predetermined cross-sectional area, the area of this jet opening varying to a degree for different size engines. The increased amount of fuel being delivered because of the increased engine speed, backs up in the passage 30 ahead of this jet and the pressure is built up resulting in a corresponding increase of fuel flow through passage 33 and port 34, whereby to slightly increase the fuel being supplied to the engine to meet the engine demand for fuel for operation at this increased speed. Reduction in speed returns the fuel pressure to normal.

It will be apparent to those skilled in the art to which our invention pertains that various changes and modifications may be made without departing from the spirit of our invention, or from the scope of the appended claims.

We claim:

1. A fuel injection system for direct continuous injection of fuel into the intake manifold of an internal combustion engine, said engine having a primary induction conduit open to a source of air supply and connected with the engine intake manifold and provided with an air throttle valve manually actuated to vary engine speed, a fuel injector means downstream from said air throttle valve and operatively connected with the aforesaid air throttle valve, said fuel injector means comprising a regulatable fuel discharge port automatically operable by said connections to vary the fuel discharge port opening directly with the opening of said air throttle valve, a fuel relief valve present to maintain a maximum fuel pressure, and a full jet of a predetermined size disposed ahead of said fuel relief valve to set up resistance to increased fuel flow on increase of fuel flow in response to increased engine speed while said variable fuel discharge port remains substantially constant whereby to increase the pressure of fuel delivered to said fuel discharge port whereby to increase the quantity of fuel being delivered to said engine intake manifold.

2. A fuel injection system for direct continuous injection for fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a regulatable fuel discharge port operatively connected with said air throttle means whereby to increase or decrease the area of said fuel discharge port as said air throttle valve is respectively opened or closed, and other means automatically operable to effect an increase of fuel pressure at said fuel discharge port in response to increased engine speed while the air throttle valve and fuel discharge port area remain substantially fixed, whereby to effectively increase fuel flow through said fuel discharge port to enrich the fuel mixture delivered to said engine for said increased engine speed.

3. A fuel injection system for direct continuous injection of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a regulatable fuel discharge port operatively connected with said air throttle means whereby to increase or decrease the area of said fuel discharge port as said air throttle valve is respectively opened or closed, and other means automatically operable to effect an increase of fuel pressure at said fuel discharge port in response to increased engine speed while the air throttle valve and fuel discharge port area remain substantially fixed, whereby to effectively increase fuel flow through said fuel discharge port to enrich the fuel mixture delivered to said engine for said increased engine speed, said other means comprising a fuel relief jet of fixed size.

4. A fuel injection system for direct continuous injection of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a regulatable fuel discharge port operatively connected with said air throttle means whereby to increase or decrease the area of said fuel discharge port as said air throttle valve is respectively opened or closed, and other means automatically operable to effect an increase of fuel pressure at said fuel discharge port in response to increased engine speed while the air throttle valve and fuel discharge port area remain substantially fixed, whereby to effectively increase fuel flow through said fuel discharge port to enrich the fuel mixture delivered to said engine for said increased engine speed, said other means comprising a fixed size fuel relief jet, and a pre-set fuel relief valve for maintining a maximum fuel pressure in said fuel supply line for idling engine operation.

5. A fuel injection system for direct continuous injection of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a regulatable fuel discharge port operatively connected with said air throttle means whereby to increase or decrease the area of said fuel discharge port as said air throttle valve is respectively opened or closed, and other means automatically operable to effect an increase of fuel pressure at said fuel discharge port in response to increased engine speed while the air throttle valve and fuel discharge port area remain substantially fixed, whereby to effectively increase fuel flow through said fuel discharge port to enrich the fuel mixture delivered to said engine for said increased engine speed, and manually operated means for varying the fuel discharge port area independently of said air throttle valve control.

6. A fuel injection system for direct continuous injection of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a tubular member disposed transversely of the primary induction conduit and having a fuel discharge nozzle facing downstream of said conduit and located generally medial of said tubular member, a pair of axially aligned shafts rotatably supported in said tubular member and having abutting end faces yieldingly urged together, one of said shafts connected with the air throttle valve and rotated therewith, means for angularly adjusting said other shaft independently of the air throttle valve adjustment, said first shaft having an eccentric outer groove registering with said fuel discharge nozzle of the tubular member, said other shaft having a fuel passage terminating in a port in the end face abutting said first mentioned shaft and registering with said eccentric groove, said first shaft operable to move said eccentric groove across the face of the port in said second shaft whereby to progressively open said port as said first shaft is rotated on opening the air throttle valve, and a fuel pump operated by said engine and delivering varying amounts of fuel to said fuel injector means proportionally to engine speed, the fuel passage of said second shaft openly communicating with the delivery side of said fuel pump.

7. A fuel injector system for direct continuous injection of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a tubular member disposed transversely of the primary induction conduit and having a fuel discharge nozzle facing downstream of said conduit and located generally medial of said tubular member, a pair of axially aligned shafts rotatably supported in said tubular member and having abutting end faces yieldingly urged together, one of said shafts connected with the air throttle valve and rotated therewith, means for angularly adjusting said other shaft independently of the air throttle valve adjustment, said first shaft having an eccentric outer groove registering with said fuel discharge nozzle of the tubular member, said other shaft having a fuel passage terminating in a port in the end face abutting said first mentioned shaft and registering with said eccentric groove, said first shaft operable to move said eccentric groove across the face of the port in said second shaft whereby to progressively open said port as said first shaft is rotated on opening the air throttle valve, and a fuel pump operated by said engine and delivering varying amounts of fuel to said fuel injector means proportionally to engine speed, the fuel passage of said second shaft openly communicating with the delivery side of said fuel pump, a fuel relief valve on the delivery side of said fuel pump, and a restricted jet fixture between said fuel relief valve and the delivery side of said pump and operable to set up an increase in fuel pressure at the delivery side of said pump on increasing the engine speed while said two shafts of the fuel injector means are relatively stationary whereby to supply an increased amount of fuel to said fuel discharge nozzle to enrich the fuel mixture delivered to said engine for said increased engine speed.

8. A fuel injection system for direct continuous injecttion of fuel into the intake manifold of an internal combustion engine, said engine having a primary induction conduit open to a source of air supply and connected with said engine intake manifold and provided with an air throttle valve, a fuel pump driven by said engine and operable to deliver variable quantities of fuel in direct proportion to engine speed, a fuel injector means downstream from said air throttle valve, said fuel injector means comprising a tubular member disposed transversely of the primary induction conduit and having a fuel discharge nozzle facing downstream of said conduit and located generally medial of said tubular member, a pair of axially aligned shafts rotatably supported in said tubular member and having abutting end faces yieldingly urged together, one of said shafts connected with the air throttle valve and rotated therewith, means for angularly adjusting said other shaft independently of the air throttle valve adjustment, said first shaft having an eccentric outer groove registering with said fuel discharge nozzle of the tubular member, said other shaft having a fuel passage terminating in a port in the end face abutting said first mentioned shaft and registering with said eccentric groove, said first shaft operable to move said eccentric groove across the face of the port in said second shaft whereby to progressively open said port as said first shaft is rotated on opening the air throttle valve, and a fuel pump operated by said engine and delivering varying amounts of fuel to said fuel injector means proportionally to engine speed, the fuel passage of said second shaft openly communicating with the delivery side of said fuel pump, and manually operated means for adjusting the relative angular position of said first and second shafts for varying the proportions of the fuel and air mixture being supplied to said engine.

References Cited in the file of this patent
UNITED STATES PATENTS

| | | |
|---|---|---|
| 1,376,201 | Harris | Apr. 26, 1921 |
| 1,801,684 | Olerich | Apr. 21, 1931 |
| 2,064,217 | Ravanelli | Dec. 15, 1936 |
| 2,614,888 | Nichols | Oct. 21, 1952 |